US009817643B2

United States Patent
He et al.

(10) Patent No.: US 9,817,643 B2
(45) Date of Patent: Nov. 14, 2017

(54) INCREMENTAL INTERPROCEDURAL DATAFLOW ANALYSIS DURING COMPILATION

(71) Applicant: Microsoft Technology Licensing, LLC, Redmond, WA (US)

(72) Inventors: Wenlei He, Sammamish, WA (US); Patrick W. Sathyanathan, Bellevue, WA (US); Ten H. Tzen, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 238 days.

(21) Appl. No.: 14/808,031

(22) Filed: Jul. 24, 2015

(65) Prior Publication Data

US 2017/0017472 A1 Jan. 19, 2017

Related U.S. Application Data

(60) Provisional application No. 62/193,608, filed on Jul. 17, 2015.

(51) Int. Cl.
*G06F 9/45* (2006.01)
*G06F 9/44* (2006.01)

(52) U.S. Cl.
CPC ............... *G06F 8/41* (2013.01); *G06F 8/433* (2013.01); *G06F 8/4441* (2013.01); *G06F 8/30* (2013.01); *G06F 8/445* (2013.01); *G06F 8/47* (2013.01)

(58) Field of Classification Search
CPC ... G06F 8/30; G06F 8/41; G06F 8/441; G06F 8/443; G06F 8/445; G06F 9/442
See application file for complete search history.

(56) References Cited

U.S. PATENT DOCUMENTS 5,170,465 A 12/1992 McKeeman et al.
5,396,627 A 3/1995 Iitsuka
(Continued)

FOREIGN PATENT DOCUMENTS

CN 101286119 A 10/2008

OTHER PUBLICATIONS

Arzt et al., "Reviser: Efficiently Updating IDE-/IFDS-Based Data-Flow Analyses in Response to Incremental Program Changes", May 31, 2014, ACM, ICSE'14, Hyderabad, India, pp. 1-11; <http://dl.acm.org/citation.cfm?id=2568243&CFID=761601880&CFTOKEN=98351079>.*

(Continued)

*Primary Examiner* — Thuy Dao
*Assistant Examiner* — Ben C Wang
(74) *Attorney, Agent, or Firm* — Ogilvie Law Firm

(57) ABSTRACT

Instead of performing local dataflow analyses on all procedures during a multi-file optimized code generation, those dataflow analyses are done only on a generally much smaller set of procedures that were actually impacted by source code edits. Incremental inter-procedural dataflow analysis (IIPDA) code identifies a set of procedures to be recompiled due to impact from one or more edits and does local dataflow analyses only on them. Results of the incremental approach for use in generating optimized code match the results of a more expensive exhaustive interprocedural dataflow analysis of all procedures, even when call graph structure has been changed by the edits. The impacted procedures are identified based on which procedures were edited, dataflow values, intermediate language representations, and a portion of the call graph.

20 Claims, 8 Drawing Sheets

(56) References Cited

U.S. PATENT DOCUMENTS

| | | | |
|---|---|---|---|
| 5,485,616 | A | 1/1996 | Burke et al. |
| 5,812,855 | A | 9/1998 | Hiranandani et al. |
| 6,820,253 | B1* | 11/2004 | Robison ............... G06F 8/443 717/140 |
| 8,473,928 | B2 | 6/2013 | Park et al. |
| 8,631,395 | B2* | 1/2014 | Sathyanathan ....... G06F 8/4435 717/155 |
| 8,671,397 | B2 | 3/2014 | Kalman et al. |
| 8,683,449 | B2 | 3/2014 | Singh et al. |
| 8,806,463 | B1 | 8/2014 | Li et al. |
| 8,966,455 | B2* | 2/2015 | Abadi ................... G06F 8/20 717/133 |
| 8,966,463 | B2 | 2/2015 | Sathyanathan et al. |
| 8,984,485 | B2 | 3/2015 | Elshishiny et al. |
| 9,182,955 | B1* | 11/2015 | He ....................... G06F 8/4435 |
| 9,262,132 | B1* | 2/2016 | Lugton ................. G06F 8/36 |
| 9,280,446 | B2* | 3/2016 | Abadi .................. G06F 11/364 |
| 9,442,707 | B2* | 9/2016 | Sathyanathan ........ G06F 8/41 |
| 9,697,022 | B2* | 7/2017 | Adams ................ G06F 9/45516 |
| 2003/0005421 | A1 | 1/2003 | Prakash et al. |
| 2006/0158354 | A1 | 7/2006 | Aberg et al. |
| 2006/0168565 | A1 | 7/2006 | Gamma et al. |
| 2007/0006151 | A1 | 1/2007 | Conway et al. |
| 2009/0313600 | A1 | 12/2009 | Ayers et al. |
| 2010/0128866 | A1 | 5/2010 | Irun-Briz et al. |
| 2011/0209126 | A1* | 8/2011 | Fehnker .............. G06F 11/3608 717/131 |
| 2012/0084761 | A1* | 4/2012 | Maeda .................. G06F 8/433 717/132 |
| 2013/0061215 | A1* | 3/2013 | Sathyanathan ....... G06F 8/4435 717/157 |
| 2013/0074052 | A1* | 3/2013 | Adams .................. G06F 8/437 717/140 |
| 2013/0139136 | A1* | 5/2013 | Sathyanathan ....... G06F 8/4441 717/157 |
| 2014/0189656 | A1* | 7/2014 | Abadi ................... G06F 8/20 717/133 |
| 2014/0331201 | A1* | 11/2014 | Adl-Tabatabai ........ G06F 8/443 717/106 |
| 2015/0347103 | A1* | 12/2015 | Mahaffey .............. G06F 8/443 717/153 |
| 2015/0378697 | A1* | 12/2015 | Sathyanathan ......... G06F 8/41 717/146 |
| 2015/0378871 | A1* | 12/2015 | Asthana ................. G06F 8/443 717/122 |
| 2016/0098342 | A1* | 4/2016 | Faizanullah ............ H04L 67/34 717/131 |
| 2016/0170724 | A1* | 6/2016 | Mahaffey ............... G06F 8/315 717/151 |
| 2017/0131975 | A1* | 5/2017 | Balasubramanian ..... G06F 8/30 |

OTHER PUBLICATIONS

R. de Groote et al., "Incremental Analysis of Cyclo-Static Synchronous Dataflow Graphs", Dec. 2015, ACM, Article No. 68, pp. 68:1-68:26; <Incremental Analysis of Cyclo-Static Synchronous Dataflow Graphs>.*

Rupesh Nasre, "Scaling Context-Sensitive Points-To Analysis", Aug. 2011, Indian Institute of Science Bangalore, pp. 1-179; <http://clweb.csa.iisc.ernet.in/nasre/tech/research/nasre-thesis-survey.pdf>.*

Shao et al., "Optimizing Incremental Scope-bounded Checking with Data-flow Analysis", Nov. 2010, IEEE, pp. 408-417; <http://ieeexplore.ieee.org/stamp/stamp.jsp?tp=&arnumber=5635077>.*

"International Search Report and Written Opinion Issued in PCT Application No. PCT/US2016/042380", dated Sep. 23, 2016, 12 Pages.

Brais, Hadi "What Every Programmer should know about Compiler Optimizations", Retrieved from: <<http://download.microsoft.com/download/E/2/A/E2ACA573-591D-4DC9-AFB9-E6260D3C6046%2FMDN_0215DG.pdf>>, Feb. 1, 2015, pp. 48-55.

Chambers, et al., "Frameworks for Intra- and Interprocedural Dataflow Analysis", In Technical Report Nov. 2, 1996, Dec. 1996, 22 pages.

Lin, et al., "Incremental Call Graph Reanalysis for AspectJ Software", In Proceedings of IEEE International Conference on Software Maintenance, Sep. 20, 2009, pp. 306-315.

Sreedhar, et al., "A New Framework for Exhaustive and Incremental Data Flow Analysis Using DJ Graphs", In Proceedings of ACM SIGPLAN Conference on Programming Language Design and Implementation, May 1, 1996, pp. 278-290.

Tok, et al., "Efficient Flow-Sensitive Interprocedural Data-Flow Analysis in the Presence of Pointers", In Proceedings of 15th International Conference on Compiler Construction, Mar. 30, 2006, pp. 17-31.

Pozza, et al., "A Lightweight Security Analyzer inside GCC", In Proceedings of Third International Conference on Availability, Reliability and Security, Mar. 4, 2008, pp. 851-858.

Burke, et al., "A Critical Analysis of Incremental Iterative Data Flow Analysis Algorithms", In Journal of IEEE Transactions on Software Engineering, vol. 16, Issue 7, Jul. 1990, pp. 723-728.

Reps, et al., "Interprocedural Dataflow Analysis via Graph Reachability", In Proceedings of Conference Record of the Twenty-Second ACM Symposium on Principles of Programming Languages, Retrieved on: Jan. 30, 2015, 51 pages.

Carini, et al., "Flow-Sensitive Interprocedural Constant Propagation", In Proceedings of the ACM SIGPLAN conference on Programming language design and implementation, Jun. 18, 1995, 9 pages.

Burke, Michael, "An Interval-Based Approach to Exhaustive and Incremental Interprocedural Data-Flow Analysis", In Journal of ACM Transactions on Programming Languages and Systems, vol. 12, Issue 3, Jul. 1990, pp. 341-395.

Conway, et al., "Incremental Algorithms for Inter-procedural Analysis of Safety Properties", In Proceedings of 17th International Conference on Computer Aided Verification, Jul. 6, 2005, 13 pages.

Ankit Asthana, "Speeding up the Incremental Developer Build Scenario", retrieved from <<http://blogs.msdn.com/b/vcblog/archive/2014/11/12/ . . . >>, Nov. 12, 2014, 5 pages.

"Note to self: Visual Studio Link Time Code Generation | Mostly Buggy", retrieved from <<https://mostlybuggy.wordpress.com/2012/05/06/note-to-self-visual-studio-link-time-code-generation/>>, May 6, 2012, 3 pages.

"The Old New Thing: Link-time code generation invalidates a lot of classical assumptions about linking", retrieved from <<http://blogs.msdn.com/b/oldnewthing/archive/2014/06/06/10531604.aspx>>, Jun. 6, 2014, 10 pages.

"What are the pros + cons of Link-Time Code Generation? (VS 2005)", retrieved from <<http://stackoverflow.com/questions/288691/what-are-the-pros-cons-of-link-time-code-generation-vs-2005>>, Nov 13, 2008, 2 pages.

"Second Written Opinion Issued in PCT Application No. PCT/US2016/042380", dated Jun. 21, 2017, 8 Pages.

* cited by examiner

Before Edit

After Edit

Before Edit

After Edit

Before Edit

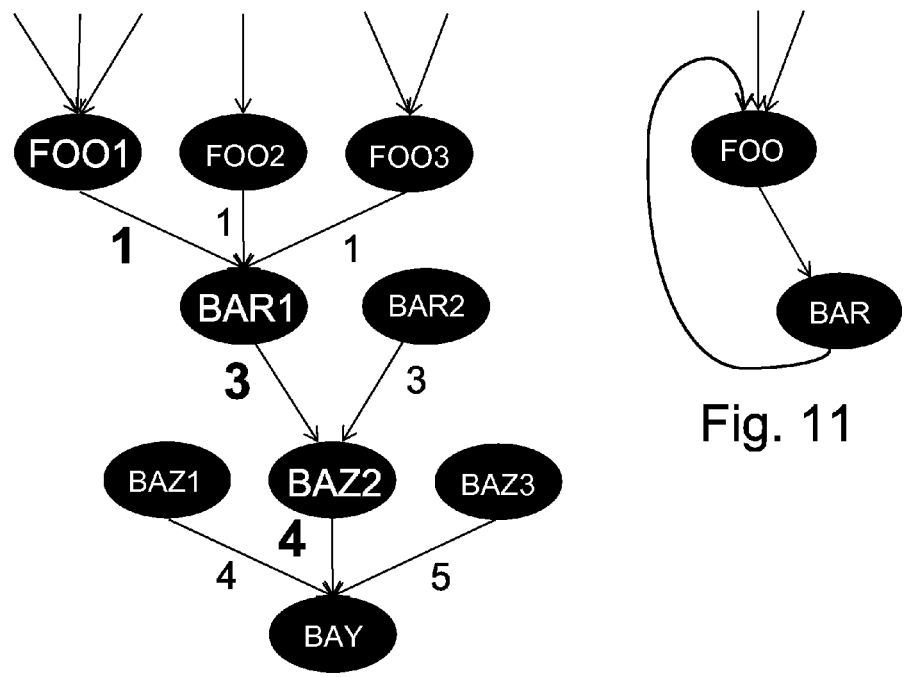
Fig. 10
Fig. 11
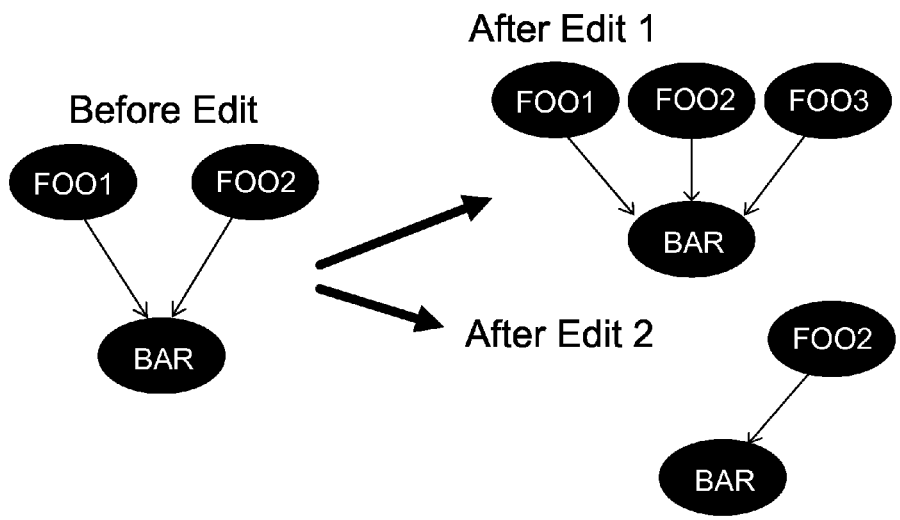
Fig. 12

INCREMENTAL INTERPROCEDURAL DATAFLOW ANALYSIS DURING COMPILATION

INCORPORATION BY REFERENCE

The present application claims priority to, and incorporates by this reference the entirety of, application No. 62/193,608 filed Jul. 17, 2015.

BACKGROUND

Software source code is transformed into executable form by a compilation process. In one approach to compilation, a compiler having a frontend and a backend compiles each file of source separately and directly generates a native object file for each source file. A linker takes all the native object files from the compiler as input, and links them together (with libraries if indicated) to produce a final image, such as an exe or dll format file.

SUMMARY

Some embodiments are directed to the technical activity of interprocedural dataflow analysis during compilation of software. Other technical activities pertinent to teachings herein will also become apparent to those of skill in the art.

Some embodiments provide or utilize an incremental inter-procedural dataflow analysis (IIPDA) code. The IIPDA code includes input interfaces and output interfaces. A call graph input interface receives (directly or indirectly) a program call graph which identifies procedures of a program. An intermediate language representation input interface receives access to intermediate language representations of at least some of the procedures. A basis procedure set input interface receives information specifying a basis set of procedures, such as a set of procedures which were edited after the last time the program was compiled. A prior dataflow values input interface receives previously calculated dataflow values for at least some of the procedures, when such values are available (if not, or if the procedure was edited, the dataflow values can be recalculated). The IIPDA code also includes an updated dataflow values output interface so that dataflow values can be saved for later use. An impacted procedures set output interface of the IIPDA code outputs a set IS of the procedures which are impacted directly or indirectly by a set of one or more source code edits. The set IS is generally smaller than the set of all procedures identified in the call graph when some procedures were not edited.

The IIPDA code is executable to transform inputs provided through the input interfaces into outputs provided through the output interfaces as part of a results-equivalent substitute for an exhaustive inter-procedural dataflow analysis. The IIPDA code, or other code using one or more algorithms taught herein for optimized interprocedural dataflow analysis, can be used to reduce code optimization processing during link time code generation, even when the call graph has changed structurally since the most recent compilation.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIGS. 9 and 10 are call graph fragment diagrams which collectively illustrate a source code change which has multi-level inter-procedural impact.

FIG. 11 is a call graph fragment diagram illustrating recursion.

FIG. 12 is a call graph fragment diagram illustrating structural changes to a call graph.

DETAILED DESCRIPTION

Acronyms

Figure 1:
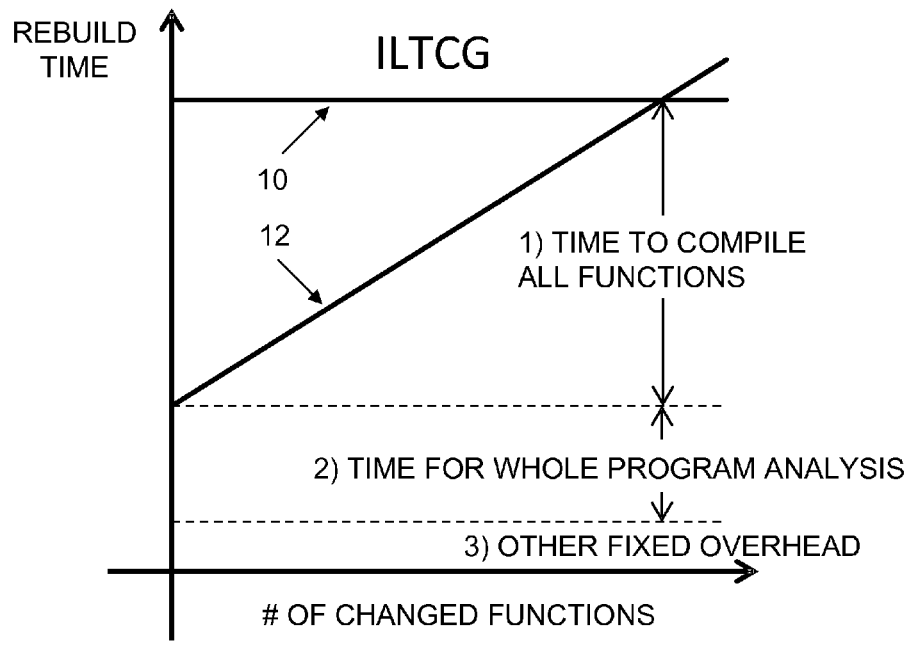
FIG. 1 is a qualitative graph illustrating the effect of incremental link time code generation (ILTCG) and similar incremental recompilation approaches on program rebuild time as a function of the number of changes made in a program between builds.

Some acronyms are defined below, but others may be defined elsewhere herein or require no definition to be understood by one of skill.

ALU: arithmetic and logic unit
API: application program interface
CD: compact disc
CIL: common intermediate language
CPU: central processing unit
DLL: dynamic link library DVD: digital versatile disk or digital video disc
FPGA: field-programmable gate array
FPU: floating point processing unit
GPU: graphical processing unit
GUI: graphical user interface
IDE: integrated development environment, sometimes also called "interactive development environment"
II: input interface
ILTCG: incremental link time code generation
JIT: just in time
LTCG: link time code generation
LTO: link time optimization
MFOCG: multi-file optimized code generation
OI: output interface
OIDA: optimized interprocedural dataflow analysis, also known as incremental interprocedural dataflow analysis
RAM: random access memory
ROM: read only memory
WPO: whole program optimization Overview Dataflow analysis permits code generation optimizations. If, for instance, a formal parameter x of a procedure foo( ) can be proved to be a constant at every call-site then the body of foo( ) can be optimized by replacing every reference to x by the known constant value. Likewise, if a global variable is known to be read-only, then the body of a function that reads the global variable can be optimized based on the fact that no memory write can change the value of that global, thus allowing it to be placed in a processor register for speedier access than if it were placed in RAM outside the processor.

In relatively early approaches to compilation, each file of source code was compiled separately and then the resulting object files were linked. In a more recent approach, examples of which are known as LTCG and LTO, a compiler frontend compiles each source file separately and generates an intermediate representation (sometimes referred to as an "intermediate language representation"), such as a CIL object file, for each source file. A linker then takes the intermediate representations as input, and calls back to compiler backend to do code generation for all of them, thereby giving the compiler backend more opportunities to make optimizations in the generated code than were available without LTCG or LTO. In particular, non-LTCG non-LTO compilation allows relatively limited inter-procedural optimization because the compiler only sees what's in the current source file when compiling that file. Without a global view of whole program, less optimization is performed. After code generation, the linker links the generated code together (with libraries as indicated) to produce a final executable image, DLL, or the like. LTCG, LTO, and other approaches in which code optimization is performed for code generation using more than one source file's intermediate representation (typically at link time), are collectively referred to herein as "multi-file optimized code generation" or MFOCG approaches.

As explained below, LTCG itself has different versions. Unless indicated otherwise, "LTCG" refers to the initial version of LTCG as implemented by Microsoft Corporation, but some similar considerations apply to LTO as implemented by other vendors. The LTCG initial version has certain characteristics relative to the prior non-LTCG approaches. For example, LTCG provides better code quality, thanks to whole program analysis and optimizations. However, LTCG build throughput is slower, due to compile time overhead spent on the whole program analysis and optimizations. In particular, rebuilding after an edit to the source is much slower with LTCG than in the prior non-LTCG approach, because an edit in one function can impact the code generation for other functions where WPO is involved. When there was any edit in any source file, this initial version of LTCG involved re-compiling all functions from all source files. By contrast, the prior non-LTCG approach only involved recompiling the edited file(s), and then linking their new object files with the previously generated object files of non-edited source files.

This initial version of LTCG was followed by a version referred to as Incremental Link Time Code Generation (ILTCG). ILTCG improved throughput for LTCG, while maintaining its improved code quality. In ILTCG, source code edits are detected (e.g., using checksums to represent function or file versions) and the effects of the edits are accurately tracked. Only functions that were edited or impacted by an edit are re-compiled. Object code for the rest of the functions is copied from a previously created location such as an IOBJ store (incremental object file store). Information used for change detection is maintained, e.g., in an IPDB (incremental program database) store. Native object files are kept to permit copying unimpacted code instead of recompiling to recreate the same code.

The inventors recognized that although ILTCG reduces compile time, it does so by reducing the amount of code for which parsing and code generation occur but does not reduce the amount of code for which dataflow analysis is done. Thus, there is still a fixed program optimization analysis overhead under ILTCG. This insight is reflected in FIGS. 1 and 2.

FIG. 1 illustrates ILTCG. The fixed rebuild time for LTCG indicated by horizontal line 10 becomes diagonal line 12 under ILTCG, in that rebuild time becomes a sum of portion 1 which is approximately proportional to the amount of changes, plus portion 2 a fixed overhead from whole program analysis, plus portion 3 overhead from other fixed tasks, e.g., change detection, linking. Note that whole program analysis portion 2 dominates the sum of portions 2 and 3, thereby limiting the upper bound of speedup obtained from ILTCG.

Figure 2:
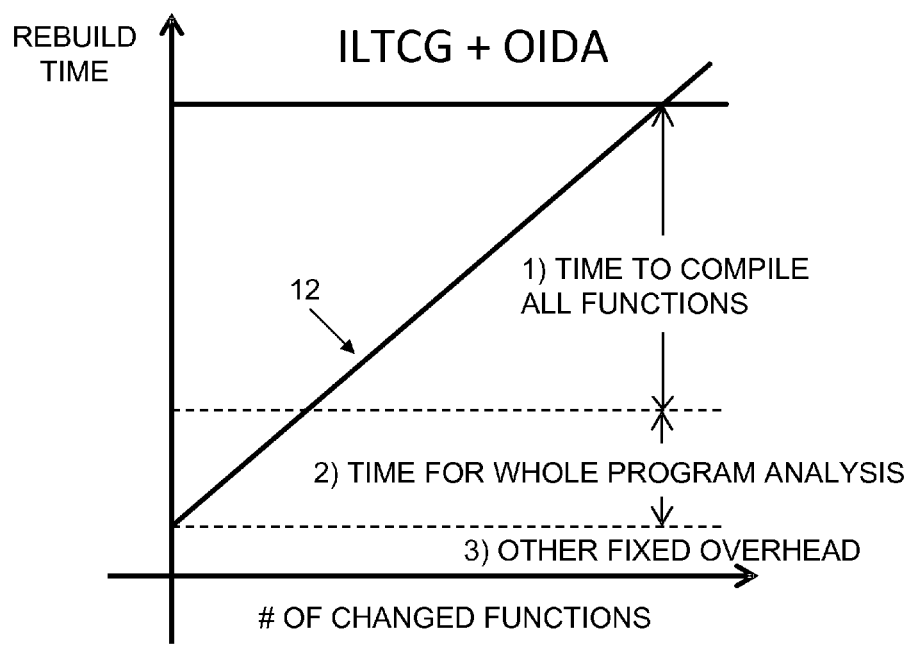
FIG. 2 is a qualitative graph illustrating the combined effects of ILTCG and optimized interprocedural dataflow analysis (OIDA) approaches on program rebuild time as a function of the number of changes made in a program between builds.

FIG. 2 illustrates optimized interprocedural dataflow analysis (OIDA) combined with ILTCG. Optimized interprocedural dataflow analysis is also sometimes referred to as "incremental interprocedural dataflow analysis". With OIDA, the overhead portion 2 is incrementalized, meaning that instead of being fixed (roughly constant) it is roughly proportional to the amount of editing done to the source code. In other words, optimizations of interprocedural dataflow analysis turn the fixed overhead of portion 2 into something generally proportional to the amount of changes in the source code, as indicated by the change in position of line 12 from FIG. 1 to FIG. 2. This analysis incrementalization further improves the throughput gain from ILTCG. Some internal experiments showed an upper bound improvement from 3.37× to 4.48×, that is, from about 3 to about five times faster.

The technical character of embodiments described herein will be apparent to one of ordinary skill in the art, and will also be apparent in several ways to a wide range of attentive readers. For instance, some embodiments address technical activities such as compilation of source code. Improvements to the operation of computers themselves are thus provided.

Reference will now be made to exemplary embodiments such as those illustrated in the drawings, and specific language will be used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Quoted terms are defined explicitly, but quotation marks are not used when a term is defined implicitly. Terms may be defined, either explicitly or implicitly, here in the Detailed Description and/or elsewhere in the application file.

"AS" denotes an All procedures Set, namely, a set of all procedures in a program of interest. See also BS and IS.

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

A "set BS of basis procedure nodes" can represent edited procedures, or it can represent the result of a previous invocation of an algorithm, as when edited procedures are input to a top-down instance of the algorithm to produce a first set of impacted procedures, which is then input to a bottom-up instance of the algorithm to produce a second set of impacted procedures. The order can also be bottom-up then top-down, or any other sequence of one or more top-down and/or bottom-up invocations. See also AS and IS.

"Code" means processor instructions, data (which includes constants, variables, and data structures), or both instructions and data.

"Computationally" means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

As used herein, a "computer system" may include, for example, one or more servers, motherboards, processing nodes, personal computers (portable or not), personal digital assistants, smartphones, smartwatches, smartbands, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "designated propagation order" can be top-down or bottom-up, and the source node and target node correspond accordingly to caller/callee or callee/caller.

An "embodiment" herein is an example. The term "embodiment" is not interchangeable with "the invention". Embodiments may freely share or borrow aspects to create other embodiments (provided the result is operable), even if a resulting aspect combination is not explicitly described per se herein. Requiring each and every permitted combination to be explicitly described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

As used herein, "include" allows additional elements (i.e., includes means comprises) unless otherwise stated. "Consists of" means consists essentially of, or consists entirely of. X consists essentially of Y when the non-Y part of X, if any, can be freely altered, removed, and/or added without altering the functionality of claimed embodiments so far as a claim in question is concerned.

An "intermediate language" can be CIL, MSIL (Microsoft intermediate language), or another intermediate language.

As used herein, "interprocedural" and "inter-procedural" are interchangeable.

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance; (g) embedment in an implanted medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, or physical transportation system monitoring.

IS denotes the Impacted procedures Set in some algorithms. See also AS and BS.

"Kernels" include operating systems, hypervisors, virtual machines, BIOS code, and similar hardware interface software.

"Linguistically" means by using a natural language or another form of communication which is often employed in face-to-face human-to-human communication. Communicating linguistically includes, for example, speaking, typing, or gesturing with one's fingers, hands, face, and/or body.

A "local dataflow analysis" can be a constant propagation analysis, a range propagation analysis, an alignment analysis, an exception throw analysis, or another dataflow analysis. "constant propagation", "range propagation", etc. are the names of different inter-procedural dataflow analyses. And each of these dataflow analyses has a local analysis part that collects local information from a procedure, plus an inter-procedural analysis part that propagates the collected information from some procedures to other procedures. So "local dataflow analysis" can be the local analysis part of a constant propagation analysis, for example, and "data flow analysis" can be constant propagation analysis, for example.

A "logical processor" or "processor" is a single independent hardware thread-processing unit, such as a core in a simultaneous multithreading implementation. As another example, a hyperthreaded quad core chip running two threads per core has eight logical processors. A logical processor includes hardware. The term "logical" is used to prevent a mistaken conclusion that a given chip has at most one processor; "logical processor" and "processor" are used interchangeably herein. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

"Optimize" means to improve, not necessarily to perfect. For example, it may be possible to make further improvements in a program which has been optimized.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Procedure" means a function, a routine, an exception handler, an interrupt handler, or another block of instructions which receives control via a jump and a context save. A context save pushes a return address on a stack or otherwise saves the return address, and may also save register contents to be restored upon return from the procedure. A procedure may have a return value, or may not; procedures with return values are sometimes called "functions". However, the term "function" may also be used interchangeably with "procedure", so when the presence or absence of a return value is significant herein, that presence or absence is indicated, e.g., by stating that a return value is present, or by indicating a return value or the use of a return value.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Program" is used broadly herein, to include applications, kernels, drivers, interrupt handlers, firmware, state machines, libraries, and other code written by programmers (who are also referred to as developers).

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. For example, certain familiar devices perform balance calculations to maintain their balance; some examples include some mobile robots and some wheeled personal mobility devices. These devices are not part of the embodiments described herein but they illustrate the point that technical effects are provided by technical components, not by mere mental steps. Balance calculations simply cannot be performed rapidly enough by mental steps or by paper and pencil to provide the balance that is present in many mobile robots or wheeled personal mobility devices. The technical effect of having a dynamically balanced device is thus provided by technical components which include a processor and a memory interacting with balance control software.

Throughout this document, use of the optional plural "(s)", "(es)", or "(ies)" means that one or more of the indicated feature is present. For example, "processor(s)" means "one or more processors" or equivalently "at least one processor".

Procedures may be referred to herein with a full signature, e.g., "void foo1(x: int)" or the like. They may also be referred to in shorter form, e.g., as "foo1( )" or as "foo".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. Unless expressly stated otherwise in a claim, a claim does not cover a signal per se. For the purposes of patent protection in the United States, a memory or other computer-readable storage medium is not a propagating signal or a carrier wave outside the scope of patentable subject matter under United States Patent and Trademark Office (USPTO) interpretation of the In re Nuijten case.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise, "computer readable medium" means a computer readable storage medium, not a propagating signal per se.

Operating Environments

Figure 3:
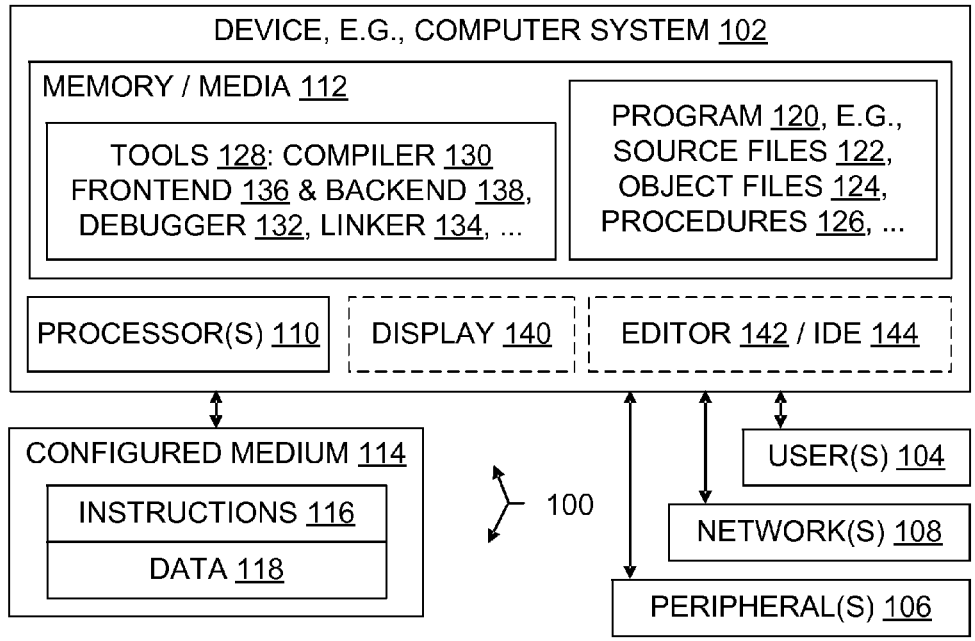
FIG. 3 is a block diagram illustrating a computer system having at least one processor and at least one memory which interact with one another under the control of software for compiling a program, and other items in an operating environment which may be present on multiple network nodes, and also illustrating configured storage medium (as opposed to a mere signal) embodiments.

With reference to FIG. 3, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A user interface may support interaction between an embodiment and one or more human users. A user interface may include a command line interface, a graphical user interface (GUI), natural user interface (NUI), voice command interface, and/or other interface presentations. A user interface may be generated on a local desktop computer, or on a smart phone, for example, or it may be generated from a web server and sent to a client. The user interface may be generated as part of a service and it may be integrated with other services, such as social networking services. A given operating environment includes devices and infrastructure which support these different user interface generation options and uses.

Natural user interface (NUI) operation may use speech recognition, touch and stylus recognition, gesture recognition both on screen and adjacent to the screen, air gestures, head and eye tracking, voice and speech, vision, touch, gestures, and/or machine intelligence, for example. Some examples of NUI technologies include touch sensitive displays, voice and speech recognition, intention and goal understanding, motion gesture detection using depth cameras (such as stereoscopic camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (electroencephalograph and related tools).

One of skill will appreciate that the foregoing aspects and other aspects presented herein under "Operating Environments" may also form part of a given embodiment. This document's headings are not intended to provide a strict classification of features into embodiment and non-embodiment feature classes.

As another example, a game may be resident on a Microsoft XBOX Live® server (mark of Microsoft Corporation). The game may be purchased from a console and it may be executed in whole or in part on the server, on the console, or both. Multiple users may interact with the game using standard controllers, air gestures, voice, or using a companion device such as a smartphone or a tablet. A given operating environment includes devices and infrastructure which support these different use scenarios.

System administrators, developers, engineers, and end-users are each a particular type of user 104. Automated agents, scripts, playback software, and the like acting on behalf of one or more people may also be users 104. Storage devices and/or networking devices may be considered peripheral equipment in some embodiments. Other computer systems not shown in FIG. 3 may interact in technological ways with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, optical media, solid-state media, and/or of other types of physical durable storage media (as opposed to merely a propagated signal). In particular, a configured medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se. Any claim interpretation to the contrary is not reasonable.

The medium 114 is configured with instructions 116 that are executable by a processor 110; "executable" is used in a broad sense herein to include machine code, interpretable code, bytecode, and/or code that runs on a virtual machine, for example. The medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, cell phone, or gaming console), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In the illustrated environments 100, one or more applications or other programs 120 have code such as source files 122 and object files 124, which include procedures 126. Software development tools 128 such as compilers 130, debuggers 132, and linkers 134 assist with software development by producing and/or transforming code 122, 124. A compiler includes a frontend 136 for parsing and building structures such as an abstract syntax tree and symbol table or the like, and also includes a backend 138 for generating native code or other low-level code. The program 120, tools 128, and other items shown in the Figures and/or discussed in the text, may each reside partially or entirely within one or more hardware media 112, thereby configuring those media for technical effects which go beyond the "normal" (i.e., least common denominator) interactions inherent in all hardware-software cooperative operation. In addition to processors 110 (CPUs, ALUs, FPUs, and/or GPUs), memory/storage media 112, display(s) 140, and battery(ies), an operating environment may also include other hardware, such as buses, power supplies, wired and wireless network interface cards, and accelerators, for instance, whose respective operations are described herein to the extent not already apparent to one of skill. The display 140 may include one or more touch screens, screens responsive to input from a pen or tablet, or screens which operate solely for output.

A given operating environment 100 may include a source code editor 142, and/or may include an Integrated Development Environment (IDE) 144 which provides a developer with a set of coordinated software development tools such as compilers, source code editors, profilers, debuggers, and so on. In particular, some of the suitable operating environments for some embodiments include or help create a Microsoft® Visual Studio® development environment (marks of Microsoft Corporation) configured to support program development. Some suitable operating environments include Java® environments (mark of Oracle America, Inc.), and some include environments which utilize languages such as C++ or C# ("C-Sharp"), but teachings herein are applicable with a wide variety of programming languages, programming models, and programs, as well as with technical endeavors outside the field of software development per se.

One or more items are shown in outline form in the Figures to emphasize that they are not necessarily part of the illustrated operating environment or all embodiments, but may interoperate with items in the operating environment or some embodiments as discussed herein. It does not follow that items not in outline form are necessarily required, in any Figure or any embodiment. In particular, FIG. 3 is provided for convenience; inclusion of an item in FIG. 3 does not imply that the item, or the described use of the item, was known prior to the current innovations.

Systems

Figure 4:
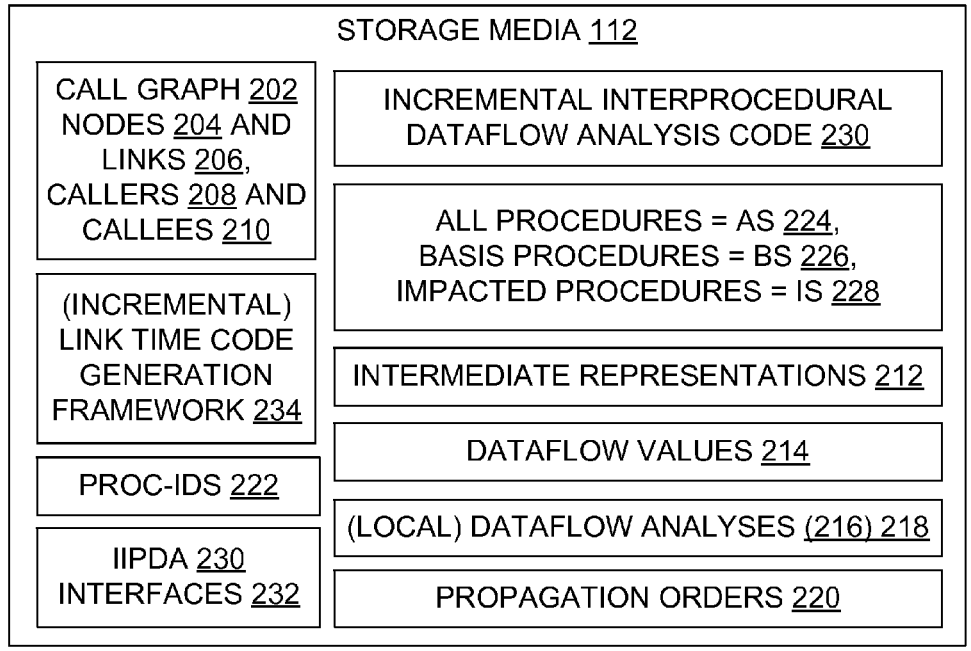
FIG. 4 is a block diagram illustrating aspects of an example architecture in which incremental inter-procedural dataflow analysis is provided as an optimization of inter-procedural dataflow analysis, which in turn facilitates code optimizations (e.g., to reduce executable code size or increase execution speed) based in part on local inter-procedural dataflow analyses.

FIG. 4 illustrates aspects of an architecture which is suitable for use with some embodiments. A computer system 102 includes a logical processor 110 and a memory 112 in operable communication with the logical processor. A call graph 202 residing in the memory has nodes 204 connected by links 206; the nodes represent procedures 126 in a given program 120. The links 206 are directional, and represent callers 208 and callees 210, namely, procedures which call other procedures and procedures which are called by other procedures. The memory also contains intermediate language representations 212 of at least some of the procedures.

In addition, the memory contains previous dataflow values 214 of at least some of the procedures from at least one of the following dataflow analyses 218: a constant propagation analysis, a range propagation analysis, a memory alignment analysis, an exception throw analysis, a top-down analysis, a bottom-up analysis. Of these, constant propagation, range propagation, memory alignment, and exception throw are examples of particular local dataflow analyses 216, while top-down and bottom-up are categories which each may include zero or more of the particular analyses available in a given system. Top-down and bottom-up also refer to propagation order 220, e.g., effects of constants on optimization generally propagate top-down (caller-to-callee) while effects of exception throws generally propagate bottom-up (callee-to-caller).

The illustrated system also includes a set BS 226 of basis procedures, and as noted below presents a set IS 228 of impacted procedures. For reference, BS and IS are subsets of an implicit set AS 224 of all procedures in the program 120. BS has been defined to include at least one of the following: a procedure having a source code which has been edited subsequent to a most recent compilation of the procedure, a procedure which has been previously presented through dataflow analysis as being impacted by one or more source code edits.

In the illustrated system, incremental inter-procedural dataflow analysis code 230 residing in the memory will, upon execution, present the set IS 228 of procedures to be recompiled due to impact from one or more source code edits. Code 230 may also be referred to as IIPDA code 230 (an acronym for "incremental inter-procedural dataflow analysis"), or OIDA (an acronym for "optimized inter-procedural dataflow analysis"). More generally, terminology describing the innovations disclosed herein is not part of the settled lexicon of the computing arts, because the innovations themselves are new. An understanding of the innovations may be assisted by considering different ways they can be described. Some embodiments are "incremental" in the sense that they provide results that are equivalent to an exhaustive dataflow analysis of all procedures, but do so based on one or more increments of the set of all procedures rather than the entire set. Innovations herein may likewise also be viewed as "partial" executions of dataflow analyses, in that only part—not all—of the set of procedures are subjected to local dataflow analysis. Since the part or portion of the procedures which is subjected to local dataflow analysis is roughly proportional to the number of procedures edited, and/or the relative amount of code edited, innovations presented herein may also be described as "proportional". Because the local dataflow analysis is performed to enable code optimization, which is a process of code transformation to produce code having certain characteristics such as faster execution or smaller size, and because the innovations optimize that otherwise familiar process by reducing the amount of processing and other computational resources used to obtain the optimized code, innovations presented herein may also be described as "optimization of analysis for optimizations", or simply as optimizations in their own right. In short, although innovations presented herein are often referred to herein as "incremental" or referred to using phrases or acronyms that are based in part on "incremental", that usage does not alter the applicability of other descriptors, including for example, "partial", "proportional", and "optimization".

Membership in IS is based by IIPDA code 230 on at least some of the previous dataflow values 214 for at least some of the procedures, on the set BS 226, on at least some of the intermediate language representations 212 for at least some of the procedures, and on at least a portion of the call graph 202.

Operation of IIPDA code 230 varies between embodiments; several examples of operational algorithms are described herein. IIPDA code 230 may use APIs, specified file formats, and/or other software mechanisms supported by suitably tailored hardware controls as interfaces 232 to obtain 304 its inputs and present its outputs. IIPDA code 230 may interface with an LTCG or ILTCG subsystem 234 to obtain inputs and/or have its outputs consumed. IIPDA code 230 may also interface with internal data of a compiler to represent procedures using one or more items, designated in FIG. 4 and herein as "proc-ids" 222, as described herein.

To illustrate and emphasize the savings in computation made possible by IIPDA code 230, several examples are now provided in which relative savings are stated as percentages. One of skill will understand, e.g., from the descriptions of the algorithms and from FIG. 2, that the percentage thresholds used in these examples are located along a relatively linear collection of percentages, as opposed to being located at discontinuities or sharply defined drops, for instance. Nearby percentages could also have been used to illustrate the computational savings, e.g., 15% rather than 10%, and 2% rather than 1%. That is, the examples are presented to illustrate the point that in some situations (e.g., relatively little code was edited 340) embodiments permit a system to analyze 346 only a small percentage 348 of the overall program, yet still perform effective whole program optimization.

With this understanding in mind, in one example the incremental inter-procedural dataflow analysis code analyzes less than ten percent of the procedures in the program, and recompilation of only the procedures in the set IS produces a program which has the same correctness and optimization characteristics as a version of the program produced by recompilation of all the procedures in the program. In another example, the incremental inter-procedural dataflow analysis code analyzes less than ten percent of the procedures in the program, and dataflow results produced by the incremental inter-procedural dataflow analysis code are the same as dataflow results produced by an exhaustive analysis of all procedures in the program. In a third example, the incremental inter-procedural dataflow analysis code analyzes less than five percent of the procedures in the program, dataflow results produced by the incremental inter-procedural dataflow analysis code are the same as dataflow results that would be produced by an exhaustive analysis of all procedures in the program, and recompilation of only the procedures in the set IS produces a program which has the same correctness and optimization characteristics as a version of the program produced by recompilation of all the procedures in the program. In a fourth example, the set IS of procedures to be recompiled contains less than one percent of the procedures in the program, the incremental inter-procedural dataflow analysis code analyzes less than two percent of the procedures in the program, and recompilation of only the procedures in the set IS produces a program which has the same correctness and optimization characteristics as a version of the program produced by recompilation of all the procedures in the program.

Some embodiments provide the same results as an exhaustive interprocedural dataflow analysis would have provided, with less computation, even though one or more structural changes have been made to the call graph. In some embodiments, the call graph 202 was changed in at least one of the following ways after calculation of at least one of the previous dataflow values 214 and before definition of the set BS 226 of basis procedures for the current compilation: a node was added to the call graph, a node was removed from the call graph, a link between nodes of the call graph was changed. In some embodiments, such call graph changes occurred after a prior compilation and before the current compilation.

Figure 5:
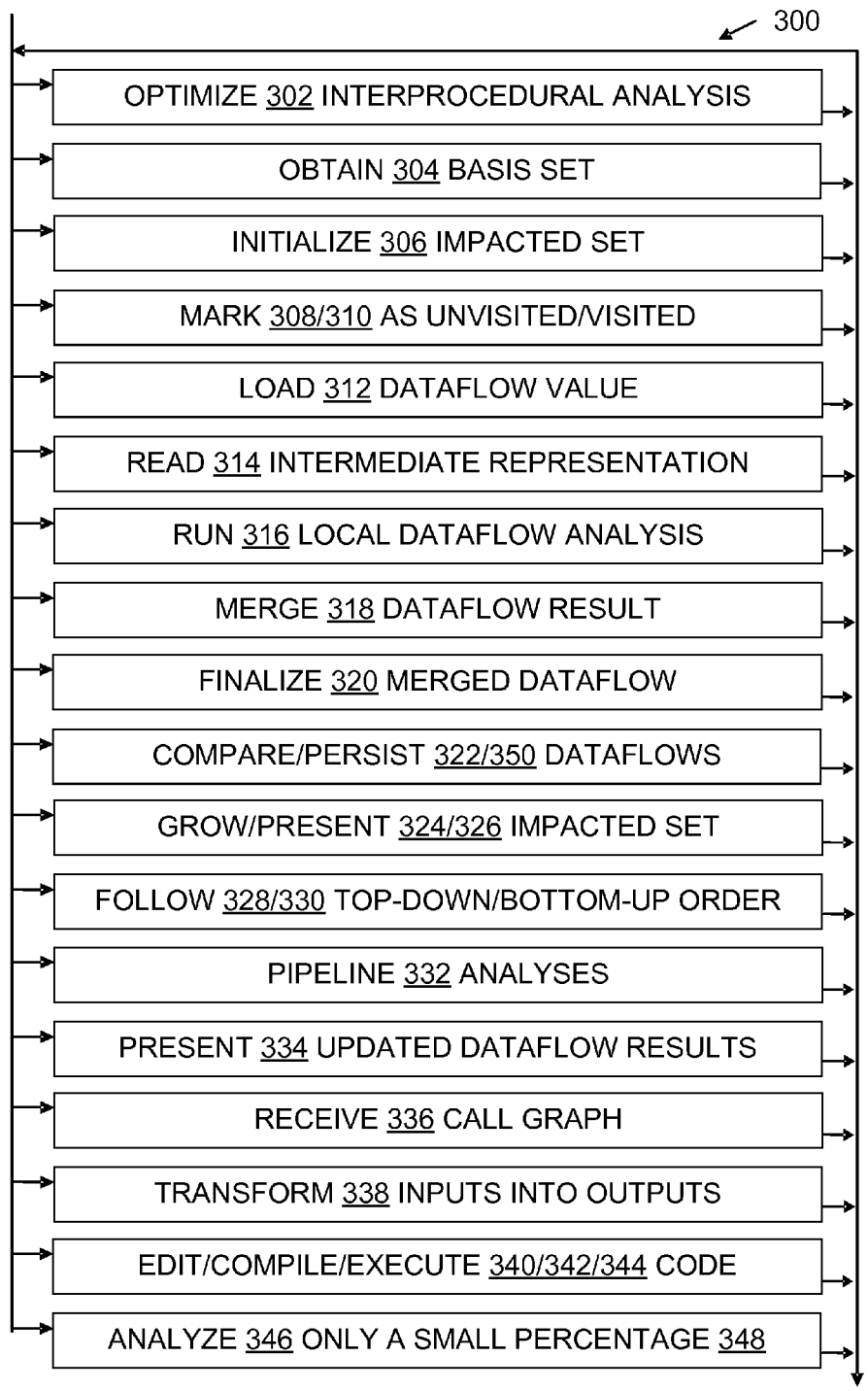
FIG. 5 is a flow chart illustrating steps of some process and configured storage medium examples.

In some embodiments, and with reference now to FIG. 5 as well, the incremental inter-procedural dataflow analysis code 230 upon execution performs at least the following operations: loading 312 a previous dataflow value for a source node 204 of the call graph when the source node is unvisited and represents a non-recursive procedure 126; reading 314 a current intermediate language representation 212 of the source node's procedure; running 316 a local dataflow analysis 216 for the source node using the source node's loaded dataflow value and current intermediate language representation, thereby producing a dataflow result 214 of the source node; and merging 318 the source node dataflow result into a dataflow value for a target node 204 of the call graph and marking 310 the source node as visited.

In some embodiments, the system 102 includes a JIT compiler 130, and the incremental inter-procedural dataflow analysis code 230 upon execution 344 presents 326 procedures 126, 122 to be recompiled by the JIT compiler.

In view of the foregoing, some embodiments provide a computer system 102 with a logical processor 110 and a memory medium 112 configured by circuitry, firmware, and/or software to provide technical effects such as inter-procedural dataflow analysis results directed at technical activities such as source code compilation and whole program optimization, by extending compiler functionality with incremental interprocedural dataflow analysis as described herein.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a technical system, such as a portion of the Internet of Things, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, which may be present in a given computer system. However, an embodiment may also communicate technical data and/or technical instructions through direct memory access, removable nonvolatile media, or other information storage-retrieval and/or transmission approaches, or an embodiment in a computer system may operate without communicating with other computer systems.

Some embodiments operate in a "cloud" computing environment and/or a "cloud" storage environment in which computing services are not owned but are provided on demand. For example, source files 122 may be on multiple devices/systems 102 in a networked cloud, previous dataflow results 214 and/or object files 124 with previous intermediate representations 212 may be stored on yet other devices within the cloud, and the ILTCG subsystem 234 enhanced with IIPDA code 230 may configure the memory and/or display on yet other cloud device(s)/system(s) 102.

Figure 13:
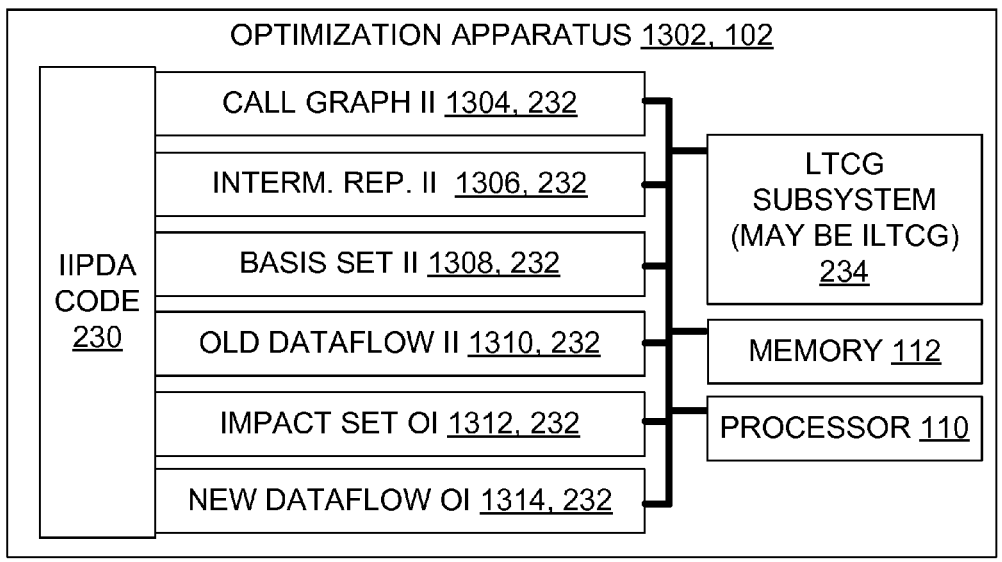
FIG. 13 is a diagram illustrating an optimization apparatus.

FIG. 13 further illustrates a system 102 in the form of an optimization apparatus 1302, which includes a processor 110, a memory 112 in operable communication with the processor, and several other components. A link time code generation (LTCG) subsystem 234, which may be an ILTCG subsystem 234, includes a compiler back end and a linker (not shown; see FIG. 3). The ILTCG/LTCG subsystem includes code executable by the processor using the memory to perform familiar aspects of incremental (or non-incremental) link time code generation. An incremental inter-procedural dataflow analysis (IIPDA) 230 in the optimization apparatus 1302 includes several interfaces 232. A call graph input interface 1304 receives 336 a program call graph which identifies procedures of a program. An intermediate language representation input interface 1306 receives object code and/or other intermediate representations 212. A basis procedure set input interface 1308 obtains 304 a representation (e.g., using proc-ids 222) of a basis set BS 226. A prior dataflow values input interface 1310 receives access to previously calculated dataflow values 214 of the call graph 202. The IIPDA also includes an updated dataflow values output interface 1314 for outputting updated dataflow values 214, and an impacted procedures set output interface 1312 which outputs a set IS 228 of the procedures (e.g., using proc-ids 222) which are impacted directly or indirectly by a set of one or more source code edits. In cases offering computational savings, the set IS is smaller than the set of all procedures identified in the call graph.

The illustrated IIPDA 230 is executable by the processor 110 using the memory 112, to transform 338 inputs provided through the input interfaces 1304, 1306, 1308, 1310 into outputs provided through the output interfaces 1312, 1314 as part of a results-equivalent substitute for an exhaustive inter-procedural dataflow analysis by the LTCG subsystem of all procedures identified in the program call graph.

In some embodiments, the updated dataflow values 214 include at least one of the following: updated dataflow values of all call sites within a procedure of the set IS, an updated return dataflow value of a procedure of the set IS.

Some embodiments include a basis procedure set 226 that includes at least one procedure whose source code has been edited subsequent to a most recent compilation of the procedure.

In some embodiments, at least one procedure 126 is represented in IS 228 using at least one of the following proc-ids 222: a compiler's internal ID of the procedure, a pointer to a function structure, a pointer to another procedure structure, a key to an entry in a group of symbols used in the program.

In some embodiments, the IIPDA 230 executes during a current compilation, and the call graph 202 changed in at least one of the following ways after a prior compilation and before the current compilation: a node was added to the call graph, a node was removed from the call graph, a link between nodes of the call graph was changed. Examples of such structural changes to a call graph are illustrated in FIG. 12. Support for any edit is provided by some embodiments, including call graph structural changes, in that any function that has different caller from the previous compilation is considered impacted and placed in set IS 228.

Processes

FIG. 5 illustrates some process embodiments in a flowchart 300. Technical processes shown in the Figures or otherwise disclosed may be performed in some embodiments automatically, e.g., by a program build under control of a script or otherwise requiring little or no contemporaneous live user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 5. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different technical features, mechanisms, and/or data structures, for instance, and may otherwise depart from the examples provided herein.

Some embodiments provide or include a process to facilitate compilation throughput and programmer productivity for a program 120 which implicitly or explicitly includes a set AS 224 containing all procedures 126 that are or can be called in the program. One such process includes steps A through L:

(A) initializing 306 a set IS of impacted procedure nodes by including 324 within IS each member of a set BS of basis procedure nodes and marking 308 each member of IS as unvisited. Each node is a node in a call graph of the program. Procedures represented by nodes of IS form a smaller set of procedures than AS. Procedures represented by nodes of BS also form a smaller set of procedures than AS.

(B) for each unvisited member node Mem of IS, performing 344 the following step C in a designated propagation order 220 in the call graph:

(C) for each target node of Mem, performing 344 the following steps D and I through K:

(D) for each source node of the target node when the target node represents a non-recursive procedure, performing 344 the following steps E through H:

(E) loading 312 a previous dataflow value for the source node when the source node is unvisited and represents a non-recursive procedure.

(F) reading 314 a current intermediate language representation of the source node's procedure.

(G) running 316 a local dataflow analysis for the source node using the source node's loaded or up-to-date dataflow value and current intermediate language representation, thereby producing a dataflow result of the source node (if the source node was visited previously in this process, it has the up-to-date dataflow value, in which event this instance of step G uses the up-to-date dataflow value, otherwise loaded dataflow value from step E is used).

(H) merging 318 the source node dataflow result, in the designated propagation order, into a dataflow value for the target node and marking the source node visited.

(I) finalizing 320 the merged dataflow of the target node, using a conservative dataflow when the target node represents a recursive procedure.

(J) comparing 322 the finalized dataflow of the target node with a previous dataflow of the target node from a point prior to step A.

(K) adding 324 the target node to the set IS of impacted procedures when the comparing step J detects a difference in the finalized dataflow of the target node and the previous dataflow of the target node.

(L) presenting 326 the procedures represented by nodes of the set IS as a set of one or more procedures which is smaller than AS and which are subject to recompilation 342 due to direct or indirect impact by at least one edit 340. Some embodiments also include an additional step of presenting 334 up-to-date dataflow results for each member of IS. Presenting up-to-date dataflow results for each member of IS avoids recalculating the dataflow values during the next execution of the algorithm. Also, a compiler may use the up-to-date dataflow values to recompile the impacted procedures. So it is expected that this will generally be done, but there may be situations where only a single execution of the algorithm is desired, e.g., to step through operation of a new or revised local dataflow analysis module, in which case presenting 334 and saving 350 the dataflow values is not necessarily done.

In some embodiments, the designated propagation order 220 is a top-down order. Analysis follows 328 the top-down order, each source node represents a caller 208 in the call graph, and each target node represents a callee 210 in the call graph.

In some embodiments, the designated propagation order 220 is a bottom-up order. Analysis follows 330 the top bottom-up order, each source node represents a callee 210 in the call graph, and each target node represents a caller 208 in the call graph.

In some embodiments, the set BS of basis procedure nodes includes nodes which represent edited procedures. In some, the set BS of basis procedure nodes includes nodes which were presented by a previous performance of steps A through K, that is, a current instance of optimization 302 processing starts with result of a previous invocation of the interprocedural dataflow analysis optimization 302 algorithm. This may occur, e.g., when pipelining 332 top-down and bottom-up dataflow analyses in a sequence.

In some embodiments, running 316 a local dataflow analysis includes analyzing at least one of the following: constant propagation, range propagation, exception throws, memory alignment.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media (as opposed to mere propagated signals). The storage medium which is configured may be in particular a removable storage medium 114 such as a CD, DVD, or flash memory. A general-purpose memory, which may be removable or not, and may be volatile or not, can be configured into an embodiment using items such as IIPDA code 230, a basis set 226, interface inputs, and an impacted procedures set 228, in the form of data 118 and instructions 116, read from a removable medium 114 and/or another source such as a network connection, to form a configured medium. The configured medium 112 is capable of causing a computer system to perform technical process steps for optimizations of interprocedural dataflow analysis during compilation 342 as disclosed herein. The Figures thus help illustrate configured storage media embodiments and process embodiments, as well as system and process embodiments. In particular, any of the process steps illustrated in FIG. 5, or otherwise taught herein, may be used to help configure a storage medium to form a configured medium embodiment.

Some embodiments use or provide a computer-readable storage medium configured with data and with instructions that when executed 344 by at least one processor causes the processor(s) to perform a technical process for identifying procedures that have been impacted by one or more source code edits. One such process includes the following steps AA through LL, which despite some similarities are not identical with the steps A through L described above.

(AA) initializing a set IS of impacted procedures by including within IS each member of a set BS of basis procedures and marking each member of IS as unvisited, each procedure being in a call graph of the program, IS being a smaller set of procedures than AS, BS also being a smaller set of procedures than AS;

(BB) for each unvisited member Mem of IS, performing the following step CC in a top-down order in the call graph:

(CC) for each callee of Mem, performing the following steps DD and II through KK:

(DD) for each caller of the callee when the callee is a non-recursive procedure, performing the following steps EE through HH:

(EE) loading a previous dataflow value for the caller when the caller is unvisited and is a non-recursive procedure;

(FF) reading a current intermediate language representation of the caller's procedure;

(GG) running a local dataflow analysis for the caller using the caller's dataflow value and current intermediate language representation, thereby producing a dataflow result of the caller;

(HH) merging the caller dataflow result, in top-down order, into a dataflow value for the callee and marking the caller visited;

(II) finalizing the merged dataflow of the callee, using a conservative dataflow when the callee is a recursive procedure;

(JJ) comparing the finalized dataflow of the callee with a previous dataflow of the callee from a point prior to step AA;

(KK) adding the callee to the set IS of impacted procedures when the comparing step JJ detects a difference in the finalized dataflow of the callee and the previous dataflow of the callee; and (LL) presenting IS as a set of one or more procedures which is smaller than AS and which are subject to recompilation due to direct or indirect impact by at least one edit.

In some embodiments, running a local dataflow analysis includes analyzing at least one of the following: constant propagation, range propagation, memory alignment. In some, the set BS of basis procedures includes at least one procedure whose source code has been edited subsequent to a most recent compilation of the procedure. In some, at least one procedure in IS is implemented using at least one of the following: a compiler's internal ID of the procedure, a pointer to a function structure, a pointer to another procedure structure, a key to an entry in a group of symbols used in the program. In some, the process occurs during a current compilation, and the call graph changed in at least one of the following ways after a prior compilation and before the current compilation: a node was added to the call graph, a node was removed from the call graph, a link between nodes of the call graph was changed.

Additional Examples

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

The following discussion is derived from internal Visual Studio® documentation (mark of Microsoft Corporation). The Visual Studio® product includes software implemented by Microsoft Corporation. Aspects of the Visual Studio® product and/or documentation are consistent with or otherwise illustrate aspects of the embodiments described herein. However, it will be understood that Visual Studio® documentation and/or implementation choices do not necessarily constrain the scope of such embodiments, and likewise that Visual Studio® software and its documentation contain features that lie outside the scope of such embodiments. It will also be understood that the discussion below is provided in part as an aid to readers who are not necessarily of ordinary skill in the art, and thus may contain and/or omit details whose recitation below is not strictly required to support the present disclosure.

Figure 6:
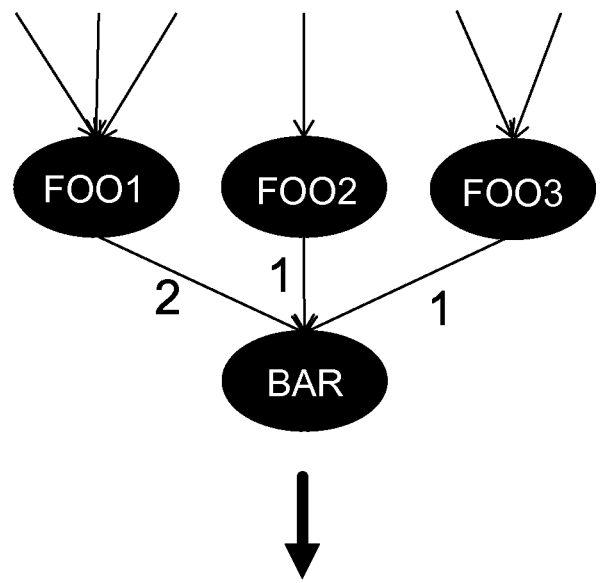
FIG. 6 is a call graph fragment diagram illustrating a source code change that has no inter-procedural impact with regard to parameter constant propagation.
Figure 6:
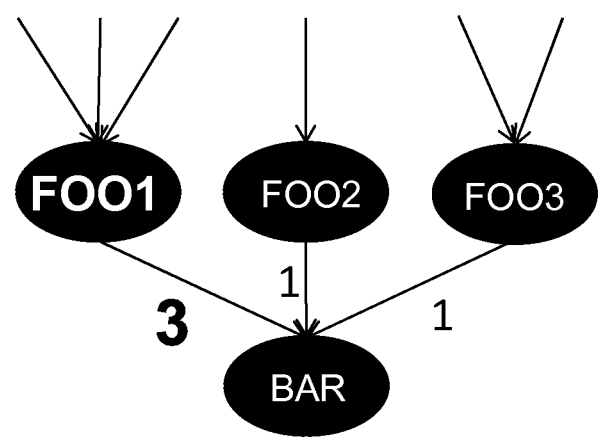

Parameter constant propagation provides an example for top-down analysis 346. For a procedure void bar(int x), if at all call sites, the parameter to bar are the same constant (or symbol), whole program optimization can eliminate the parameter by substituting it with the const. FIG. 6 illustrates an example of a change 340 that has no inter-procedural impact with regard to parameter constant propagation. Before the edit, the three call sites have different constant values 214 (namely, 2, 1, and 1) passed to procedure bar, so bar has no parameter constant info. After an edit in foo1, the changed code passes 3 instead of 2 to the call site in foo1. However the compiler backend's program 120 performance optimization code still has no parameter constant info for bar, because parameter values from the three call sites are still different. For purposes of parameter constant propagation, IIPDA 230 can determine that the change in foo1 is local and won't escape to bar.

Figure 7:
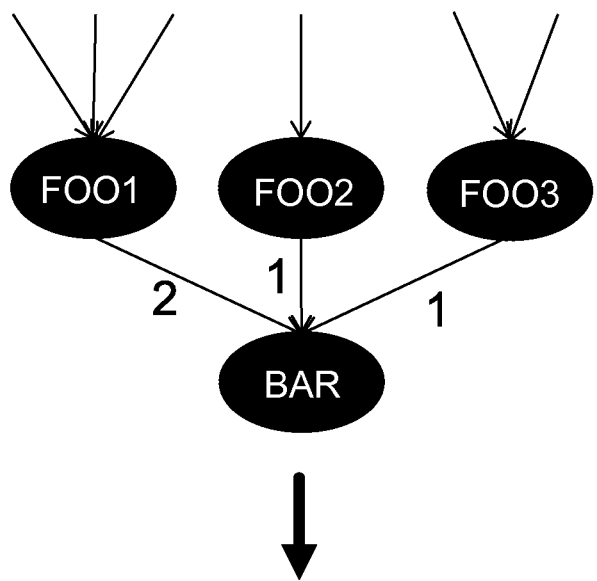
FIG. 7 is a call graph fragment diagram illustrating a source code change that does have inter-procedural impact with regard to parameter constant propagation.
Figure 7:
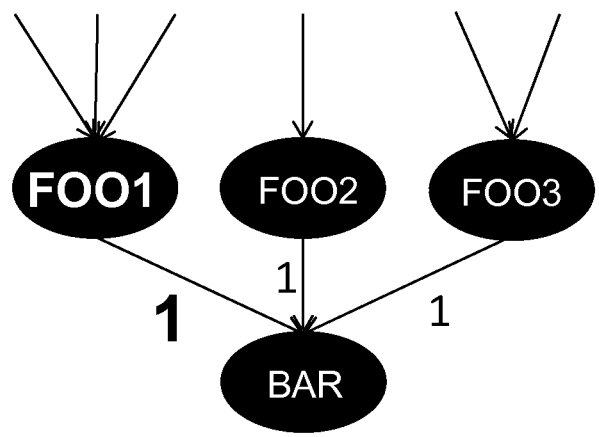

By contrast, FIG. 7 illustrates an example of a change 340 that has inter-procedural impact. Before the edit, the three call sites of procedure bar have different constant values, as in the FIG. 6 example. However, after an edit in procedure foo1, the code now passes 1 instead of 2 to the call site in foo1. As a result, parameter constant info for bar is available, because the parameters from the three call sites now have the same constant value. For the purpose of parameter constant propagation, the change in foo1 is not local and can escape to bar, causing bar to have different parameter dataflow, and potentially leading to a better optimized bar.

Figure 8:
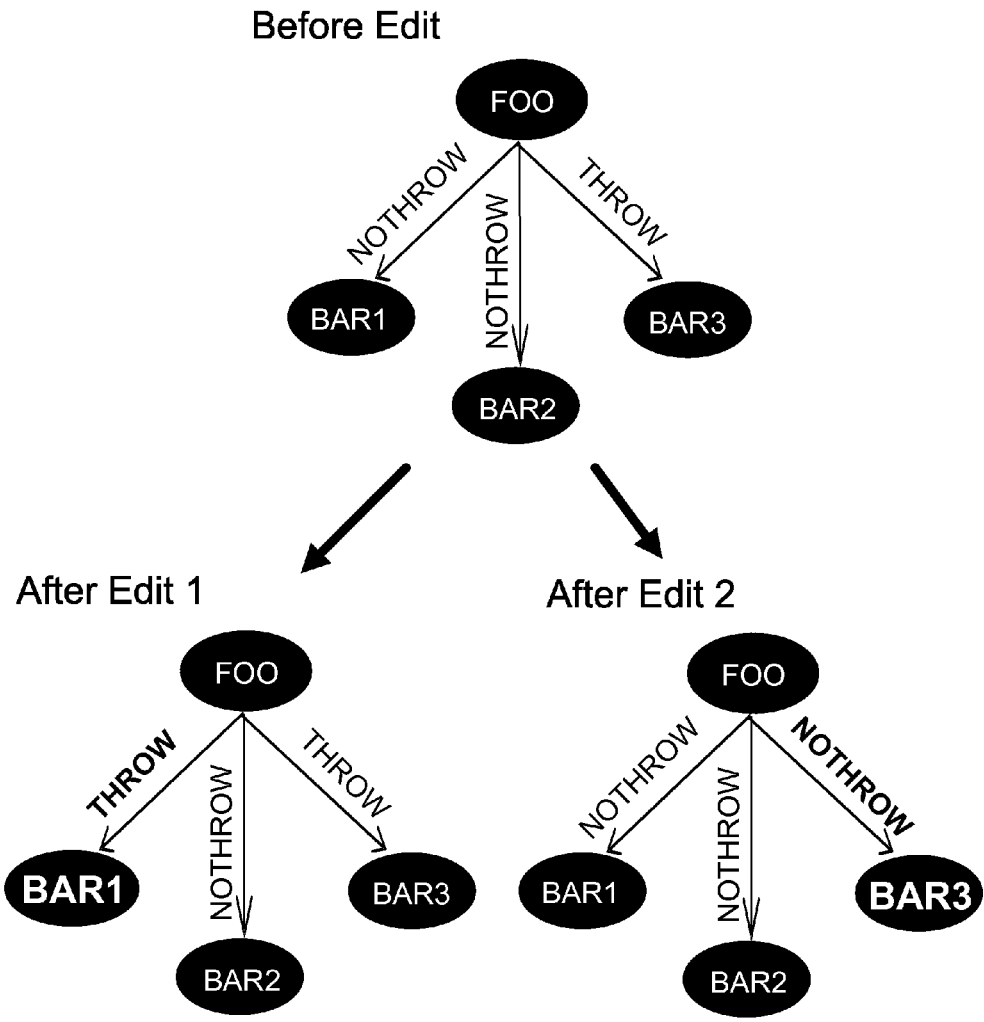
FIG. 8 is a call graph fragment diagram illustrating two source code changes, one of which has no inter-procedural impact with regard to exception throws, and one which does have such impact.

FIG. 8 provides an example for bottom-up analysis 346. For caller foo( ), assume the function itself never throws an exception if none of its callees throw. In the call graph fragment illustrated, before an edit foo can potentially throw an exception because callee bar3 can throw one. After an edit designated as Edit 1, foo can still throw as two of its callees throw, so the change in bar1 won't escape to foo for exception throw analysis (sometimes referred to in some environments as EH throw analysis). However, after an alternative edit designated as Edit 2, foo cannot throw as none of its callees throw, so the change in bar3 will escape to foo for exception throw analysis.

Figure 9:
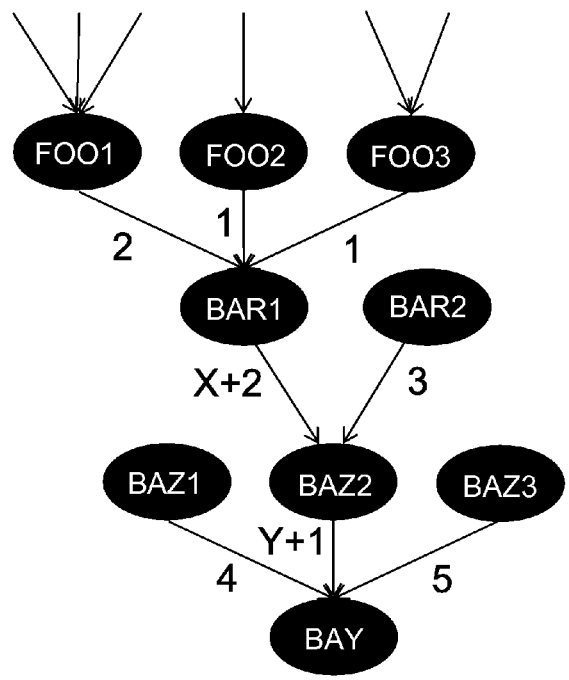

FIGS. 9 and 10 illustrate an example of a change 340 that has multi-level inter-procedural impact. For simplicity, assume all functions in this example take an int parameter. Also assume that void bar1(int x) calls baz2(int y) with its parameter x+2; baz2 calls bay with its parameter y+1. The edit in foo caused bar1 to have parameter constant info (1) now, so bar1 is added to the set of impacted functions. When processing bar1, the IIPDA 230 found that bar1's callee baz2 now has also has parameter constant info (3), so baz2 is added to the set of impacted functions. When processing baz2, the IIPDA found the parameter constant info for its callee bay is not changed, so analysis of this portion of the call graph to determine impacted functions is complete.

As to termination of an algorithm given a recursive call graph portion, as for instance illustrated in FIG. 11, these observations are offered about some embodiments, e.g., those using Algorithm RCI. Single direction (top-down or bottom-up) propagation plus no dataflow along recursive edge (unlike FIG. 11) guarantees that the list of impacted functions will converge. For the recursion case as in FIG. 11, since bar has a recursive call back to foo, the back (recursive) edge invalidates dataflow from other incoming edges to foo, so the embodiment does not use the dataflow for foo to calculate the dataflow from foo to bar. This breaks the cycle dependency by eliminating dependency of foo on bar, but keeps the dependency of bar on foo.

One algorithm presented herein takes a set of changed (new or modified, as determined by an incremental LTCG framework) functions, previous dataflow for all previous functions, and mapping between previous functions and current functions (provided by the incremental LTCG framework) as input; it produces dataflow results for all affected functions after edit. It can deal with both bottom-up or top-down dataflow analysis.

Take top-down analysis as an example: instead of always rerunning the entire top-down analysis for all functions, one algorithm starts from a changed function. The changed function could impact its callees during top-down propagation. So for each of its callees, the algorithm reruns a local analysis for their callers using the callers' stored entry dataflow, so that each callee of the changed function can have an up-to-date top-down dataflow result. When this is done, the algorithm compares the up-to-date dataflow with the stored previous one, and if there's a change in the dataflow, considers this callee as changed and repeats the same process for the callee. This is an iterative algorithmic process that converges when no dataflow result change is detected. This is done for each function in the initial changed set, and for every inter-procedural analysis. When it converges, a result is a set of impacted (a.k.a. affected) functions, with their new dataflow results for each inter-procedural analysis. Bottom-up analysis is incrementalized in the same manner, except that propagation happens in the reverse order.

The following algorithm, designated here as Algorithm RCO (recursion coverage omitted) provides one incremental inter-procedural dataflow analysis solution. For an edited function, Algorithm RCO determines whether the edit has inter-procedural impact for a particular optimization, without the information on call edge (e.g. without storing whether there's any constant info from each caller to bar; only bar's parameter constant info from previous compilation is used), and without rerun analysis on all functions 126 (i.e., by an incremental rather than an exhaustive dataflow analysis 346). Top-down analysis is used here as an example, but Algorithm RCO can be applied to bottom-up analyses in reverse order by swapping callers for callees:

1. Initialize the set of impacted functions with the set of edited functions
2. For each unvisited impacted function, in top-down order:
3. For each non-recursive callee of the impacted function:
4. For each caller of the callee:
5. Load previous dataflow value from IPDB for caller if the caller is not visited
6. Read in current CIL of the caller
7. Run local analysis for the caller using caller's dataflow result, current CIL.
8. Merge top-down dataflow result from caller into callee, mark caller visited.
9. Finalize the up-to-date dataflow merged into callee
10. Compare ca/lee's up-to-date dataflow with previous one from IPDB;
11. Add the callee to the set of impacted functions if it is different For analysis 346 that includes recursive functions, the following Algorithm RCI (recursion coverage included) can be used. Top-down is again used as an example order, but bottom-up analyses in reverse order can be done by swapping callers for callees:

1. Initialize the set of impacted function with the set of edited functions
2. For each unvisited impacted function, in top-down order:
3. For each callee of the impacted function:
4. For each caller of non-recursive callee:
5. Load previous dataflow value from IPDB for caller if the caller is not visited and not recursive
6. Read in current CIL of the caller
7. Run local analysis for the caller using caller's dataflow result, current CIL.
8. Merge top-down dataflow result from caller into callee, mark caller visited.
9. Finalize the up-to-date dataflow merged into callee, use conservative dataflow for recursive callee
10. Compare callee's up-to-date dataflow with previous one from stored previous dataflow (from IPDB);
11. Add the callee to the set of impacted functions if it is different Some embodiments also persist 350 the dataflow for all functions, including up-to-date dataflow 214 for impacted functions in IS 228, and old values 214 for those not impacted. This makes is easier for the embodiment to do incremental analysis again after another round of edits in the future.

More generally, some embodiments support dataflow analyses without storing per-edge dataflow values. In illustrated examples, the parameter constant dataflow on edges are not stored, instead they are recalculated during steps 5-8 from callers of a potentially impacted callee. Also worth noting is that approaches taught herein can be applied to both top-down and bottom-up inter-procedural analysis, and they can be applied to various optimizations including constant propagation, range propagation, alignment propagation, EH optimization, and so on. These incremental solutions produce exactly the same dataflow results as an exhaustive approach which analyses all function of the program, so code quality is as good as rerunning the entire analysis for all functions. But the incremental solutions greatly improve throughput in situations where only a fraction of the program's functions have been edited.

Some Additional Combinations and Variations

Any of these combinations of code, data structures, logic, components, signals, signal timings, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the medium combinations and variants describe above.

Some embodiments efficiently identify procedures which are not impacted by an edit to source code and therefore do not need to be recompiled to produce a correct and optimized executable.

In some embodiments dataflow values are propagated in top-down order for a dataflow analysis such as constant propagation. A member procedure Mem of IS is reanalyzed using a local dataflow analysis. The result of this analysis is a dataflow value for each call-site in Mem as well as one dataflow value for the result computed by Mem. The dataflow value at each call-site represents flow of information from that call-site to the callee procedure invoked at the call-site. The dataflow value for the result represents flow of information from Mem to its caller procedures. In some embodiments, the granularity of the dataflow information computed supports one dataflow value per call-site and one return dataflow value. Then the subsequent step of recomputing the dataflow depends on the propagation direction. In the top-down direction the dataflow values of all call-sites invoking the target node are merged to form the input dataflow value for the target. In the bottom-up direction the return dataflow value is merged into that of the target.

In some embodiments, recompilation may be directed at code correctness, code quality, or both.

In some embodiments, not every procedure will have call sites, and/or not every procedure will compute a return result.

Some embodiments have inputs which include: (a) Dataflow values for all functions from previous compilation, before edit. These may be stored in some persistent form, e.g. IPDB, and handled by an incremental LTCG framework. (b) Set of changed/edited functions (determined, e.g., by an incremental LTCG framework. (c) Complete call graph of current compilation. (d) CIL of all functions in current compilation. Outputs include (e) Minimum set of functions impacted by the changes. (f) Up-to-date dataflow values for all impacted functions.

An example designated herein as example 21 includes a computer-readable storage medium configured with data and with instructions that when executed by at least one processor causes the processor(s) to perform a technical process for identifying procedures that have been impacted by one or more source code edits. The process includes:
(AA) initializing a set IS of impacted procedures by including within IS each member of a set BS of basis procedures and marking each member of IS as unvisited, each procedure being in a call graph of the program, IS being a smaller set of procedures than AS, BS also being a smaller set of procedures than AS;
(BB) for each unvisited member Mem of IS, performing the following step CC in a top-down order in the call graph:
(CC) for each callee of Mem, performing the following steps DD and II through KK:
(DD) for each caller of the callee when the callee is a non-recursive procedure, performing the following steps EE through HH:
(EE) loading a previous dataflow value for the caller when the caller is unvisited and is a non-recursive procedure;
(FF) reading a current intermediate language representation of the caller's procedure;
(GG) running a local dataflow analysis for the caller using the caller's dataflow value and current intermediate language representation, thereby producing a dataflow result of the caller;
(HH) merging the caller dataflow result, in top-down order, into a dataflow value for the callee and marking the caller visited;
(II) finalizing the merged dataflow of the callee, using a conservative dataflow when the callee is a recursive procedure;
(JJ) comparing the finalized dataflow of the callee with a previous dataflow of the callee from a point prior to step AA;
(KK) adding the callee to the set IS of impacted procedures when the comparing step JJ detects a difference in the finalized dataflow of the callee and the previous dataflow of the callee; and
(LL) presenting IS as a set of one or more procedures which is smaller than AS and which are subject to recompilation due to direct or indirect impact by at least one edit.

Example 22 includes the computer-readable storage medium of example 21, wherein running a local dataflow analysis includes analyzing at least one of the following: constant propagation, range propagation, memory alignment.

Example 23 includes the computer-readable storage medium of example 21, wherein the set BS of basis procedures includes at least one procedure whose source code has been edited subsequent to a most recent compilation of the procedure.

Example 24 includes the computer-readable storage medium of example 21, wherein at least one procedure in IS is implemented using at least one of the following: a compiler's internal ID of the procedure, a pointer to a function structure, a pointer to another procedure structure, a key to an entry in a group of symbols used in the program.

Example 25 includes the computer-readable storage medium of example 21, wherein the process occurs during a current compilation, and wherein the call graph changed in at least one of the following ways after a prior compilation and before the current compilation: a node was added to the call graph, a node was removed from the call graph, a link between nodes of the call graph was changed.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIG. 5 also help describe configured media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A process to facilitate compilation throughput and programmer productivity for a program which includes a set AS containing all procedures called in the program, the process comprising:
   (A) initializing a set IS of impacted procedure nodes by including within IS each member of a set BS of basis procedure nodes and marking each member of IS as unvisited, each node being a node in a call graph of the program, procedures represented by nodes of IS being a smaller set of procedures than AS, procedures represented by nodes of BS also being a smaller set of procedures than AS;
   (B) for each unvisited member node Mem of IS, performing the following step C in a designated propagation order in the call graph:
   (C) for each target node of Mem, performing the following steps D and I through K:
   (D) for each source node of the target node when the target node represents a non-recursive procedure, performing the following steps E through H:
   (E) loading a previous dataflow value for the source node when the source node is unvisited and represents a non-recursive procedure;
   (F) reading a current intermediate language representation of the source node's procedure;
   (G) running a local dataflow analysis for the source node using the source node's dataflow value and current intermediate language representation, thereby producing a dataflow result of the source node;
   (H) merging the source node dataflow result, in the designated propagation order, into a dataflow value for the target node and marking the source node visited;
   (I) finalizing the merged dataflow of the target node, using a conservative dataflow when the target node represents a recursive procedure;
   (J) comparing the finalized dataflow of the target node with a previous dataflow of the target node from a point prior to step A;
   (K) adding the target node to the set IS of impacted procedures when the comparing step J detects a difference in the finalized dataflow of the target node and the previous dataflow of the target node; and
   (L) presenting the procedures represented by nodes of the set IS as a set of one or more procedures which is smaller than AS and which are subject to recompilation due to direct or indirect impact by at least one edit.

2. The process of claim 1, wherein the designated propagation order is a top-down order, each source node represents a caller in the call graph, and each target node represents a callee in the call graph.

3. The process of claim 1, wherein the designated propagation order is a bottom-up order, each source node represents a callee in the call graph, and each target node represents a caller in the call graph.

4. The process of claim 1, wherein the set BS of basis procedure nodes includes nodes which represent edited procedures.

5. The process of claim 1, wherein the set BS of basis procedure nodes includes nodes which were presented by a previous performance of steps A through K, that is, processing starts with a result of a previous invocation of the algorithm.

6. The process of claim 1, wherein running a local dataflow analysis includes analyzing at least one of the following: constant propagation, range propagation, restrictness, exception throws, memory alignment, dead catch handler elimination, processor-architecture-specific double alignment.

7. The process of claim 1, further comprising presenting up-to-date dataflow results for each member of IS.

8. The process of claim 1, further comprising pipelining top-down and bottom-up analyses.

9. An optimization apparatus comprising:
   a processor;
   a memory in operable communication with the processor;
   a multi-file optimized code generation (MFOCG) subsystem which includes a compiler back end and a linker, the MFOCG subsystem executable by the processor using the memory; and
   an incremental inter-procedural dataflow analysis (IIPDA) code which includes:
      a call graph input interface that receives a program call graph which identifies procedures of a program,
      an intermediate language representation input interface,
      a basis procedure set input interface, and
      a prior dataflow values input interface, the IIPDA also including
      an updated dataflow values output interface, and
      an impacted procedures set output interface which outputs a set IS of the procedures which are impacted directly or indirectly by a set of one or more source code edits, where the set IS is smaller than the set of all procedures identified in the call graph, wherein at least one procedure is represented in IS using at least one of the following: a compiler's internal ID of the procedure, a pointer to a function structure, a pointer to another procedure structure, a key to an entry in a group of symbols used in the program, and wherein the IIPDA is executable by the processor using the memory to transform inputs provided through the input interfaces into outputs provided through the output interfaces as part of a results-equivalent substitute for an exhaustive inter-procedural dataflow analysis by the MFOCG subsystem of all procedures identified in the program call graph.

10. The optimization apparatus of claim 9, wherein the updated dataflow values include at least one of the following: updated dataflow values of all call sites within a procedure of the set IS, an updated return dataflow value of a procedure of the set IS.

11. The optimization apparatus of claim 9, further comprising a basis procedure set that includes at least one procedure whose source code has been edited subsequent to a most recent compilation of the procedure.

12. The optimization apparatus of claim 9, wherein the IIPDA executes during a current compilation, and wherein the call graph changed in at least one of the following ways after a prior compilation and before the current compilation: a node was added to the call graph, a node was removed from the call graph, a link between nodes of the call graph was changed.

13. A computer system comprising:
a logical processor;
a memory in operable communication with the logical processor;
a call graph residing in the memory and having nodes which represent procedures in a program;
intermediate language representations of at least some of the procedures;
previous dataflow values of at least some of the procedures from at least one of the following dataflow analyses: a constant propagation analysis, a range propagation analysis, a memory alignment analysis, an exception throw analysis, a top-down analysis, a bottom-up analysis;
a set BS of basis procedures which has been defined to include at least one of the following: a procedure having a source code which has been edited subsequent to a most recent compilation of the procedure, a procedure which has been previously presented through dataflow analysis as being impacted by one or more source code edits; and
incremental inter-procedural dataflow analysis code residing in the memory which upon execution presents a set IS of procedures to be recompiled due to impact from one or more source code edits, based on at least some of the previous dataflow values, the set BS, at least some of the intermediate language representations, and at least a portion of the call graph; and
wherein the incremental inter-procedural dataflow analysis code upon execution performs at least the following operations:
loading a previous dataflow value for a source node of the call graph when the source node is unvisited and represents a non-recursive procedure;
reading a current intermediate language representation of the source node's procedure;
running a local dataflow analysis for the source node using (i) the source node's loaded dataflow value or dataflow value calculated when visiting the source node and (ii) current intermediate language representation, thereby producing a dataflow result of the source node; and
merging the source node dataflow result into a dataflow value for a target node of the call graph and marking the source node as visited.

14. The system of claim 13, wherein the incremental inter-procedural dataflow analysis code analyzes less than ten percent of the procedures in the program, and recompilation of only the procedures in the set IS produces a program which has the same correctness and optimization characteristics as a version of the program produced by recompilation of all the procedures in the program.

15. The system of claim 13, wherein the incremental inter-procedural dataflow analysis code analyzes less than ten percent of the procedures in the program, and dataflow results produced by the incremental inter-procedural dataflow analysis code are the same as dataflow results produced by an exhaustive analysis of all procedures in the program.

16. The system of claim 13, wherein the incremental inter-procedural dataflow analysis code analyzes less than five percent of the procedures in the program, dataflow results produced by the incremental inter-procedural dataflow analysis code are the same as dataflow results that would be produced by an exhaustive analysis of all procedures in the program, and recompilation of only the procedures in the set IS produces a program which has the same correctness and optimization characteristics as a version of the program produced by recompilation of all the procedures in the program.

17. The system of claim 13, wherein the set IS of procedures to be recompiled contains less than one percent of the procedures in the program, the incremental inter-procedural dataflow analysis code analyzes less than two percent of the procedures in the program, and recompilation of only the procedures in the set IS produces a program which has the same correctness and optimization characteristics as a version of the program produced by recompilation of all the procedures in the program.

18. The system of claim 13, wherein the call graph was changed in at least one of the following ways after calculation of at least one of the previous dataflow values and before definition of the set BS of basis procedures: a node was added to the call graph, a node was removed from the call graph, a link between nodes of the call graph was changed.

19. The system of claim 13, further comprising a just in time compiler, and wherein the incremental inter-procedural dataflow analysis code upon execution presents procedures to be recompiled by the just in time compiler.

20. The system of claim 13, wherein at least one procedure is represented in IS using at least one of the following: a compiler's internal ID of the procedure, a pointer to a function structure, a pointer to another procedure structure, a key to an entry in a group of symbols used in the program.

* * * * *